United States Patent
Beyda (10) Patent No.: US 7,653,733 B2
(45) Date of Patent: Jan. 26, 2010

(54) METHOD AND APPARATUS FOR FACILITATING GRANTING OF A PERMISSION REGARDING A STORED ELEMENT

(75) Inventor: William J. Beyda, Cupertino, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 766 days.

(21) Appl. No.: 10/456,151

(22) Filed: Jun. 5, 2003

(65) Prior Publication Data

US 2005/0021780 A1 Jan. 27, 2005

(51) Int. Cl.
*G06F 15/16* (2006.01)
(52) U.S. Cl. .................. 709/229; 709/203; 709/205; 709/228
(58) Field of Classification Search .......... 709/229, 709/228, 205, 203
See application file for complete search history.

(56) References Cited

U.S. PATENT DOCUMENTS

| | | | |
|---|---|---|---|
| 5,857,189 A | 1/1999 | Riddle | |
| 6,002,402 A | 12/1999 | Schacher | |
| 6,233,600 B1 | 5/2001 | Salas et al. | |
| 6,308,173 B1 | 10/2001 | Glasser et al. | |
| 6,393,429 B1 | 5/2002 | Yagi et al. | |
| 7,386,889 B2 * | 6/2008 | Shay | 726/26 |
| 2002/0049806 A1 * | 4/2002 | Gatz et al. | 709/203 |
| 2002/0178271 A1 * | 11/2002 | Graham et al. | 709/229 |
| 2003/0149781 A1 * | 8/2003 | Yared et al. | 709/229 |

* cited by examiner

*Primary Examiner*—Tonia L Dollinger
*Assistant Examiner*—Kyung H Shin (57) ABSTRACT

A system, method, apparatus, means, and computer program code for facilitating sharing and using of information such as files, folders, or other stored elements is provided. According to some embodiments, a user may access or use an interface or window to establish one or more permissions regarding a file, folder or other stored element and provide such permissions to one or more other entities. In some embodiments, an entity may be or include an individual person, a group of people, a software application or device, etc. A permission established by a user may be or include allowing an entity to access, read, copy, modify, save, use, etc. a file, folder, or other stored element.

19 Claims, 7 Drawing Sheets

METHOD AND APPARATUS FOR FACILITATING GRANTING OF A PERMISSION REGARDING A STORED ELEMENT

FIELD OF THE INVENTION

The present invention relates to a method and apparatus for facilitating sharing of information and, more particularly, embodiments of the present invention relate to methods, means, apparatus, and computer program code for allowing a user to grant a permission regarding a file, folder or other stored element to one or more contacts or collaborative groups.

BACKGROUND

A user of a computer, personal data assistant (PDA) or other client type device often may have files, folders, etc. that the user wishes to share with other users or groups of users. For example, a user may want to share a presentation developed by the user with members of a company's sales force. While in some prior art systems the user may be able to manually assign permission to one or more other entities to access a file, folder, document, etc., such prior art systems generally rely on the user manually placing the file, folder, document, etc. into a shared memory or storage area and manually assigning desired permissions. Such a system is inefficient and places a burden on the user. In addition, the user may not be able to assign permissions on a specific entity-by-entity basis.

It would be advantageous to provide a method and apparatus that overcame the drawbacks of the prior art. In particular, it would be desirable to provide a method, apparatus, means, and computer code that facilitated use or other sharing of information such as files, folders, etc. by allowing a user to grant a permission regarding a file, folder, or other stored element to other people or groups.

SUMMARY OF THE INVENTION

Embodiments provide a system, method, apparatus, means, and computer program code for facilitating sharing and using of information such as files, folders, etc. According to some embodiments, a user may access or use an interface or window to establish or grant one or more permissions regarding a file, folder, or other stored element and provide such permissions to one or more other entities. In some embodiments, an entity may be or include an individual person, a group of people, a software application or device, etc. A permission established or granted by a user may be or include allowing an entity to access, read, copy, modify, etc. a file, folder, or other collection or group of documents, files, etc. (herein referred to as "stored elements").

Additional advantages and novel features of the invention shall be set forth in part in the description that follows, and in part will become apparent to those skilled in the art upon examination of the following or may be learned by the practice of the invention.

According to some embodiments, a method for facilitating granting of a permission regarding a file, folder or other stored element may include receiving data indicative of an entity; receiving data indicative of a file, folder or other stored element; receiving data indicative of a permission to be provided to the entity regarding the file, folder or other stored element; and providing the permission to the entity regarding the file, folder or other stored element. In some embodiments, a method for facilitating granting of a permission regarding a file, folder or other stored element may include displaying a first window, the first window including a second list of at least one entity; displaying a second window, the second window including a first list of at least one file, folder or other stored element; determining a selection of a first file, folder or other stored element from the first list and a first entity from the second list; and determining a permission to be provided to the first entity regarding the first file, folder or other stored element. In some embodiments, systems, means, and/or computer code may implement the one or more of the methods described herein.

With these and other advantages and features of the invention that will become hereinafter apparent, the nature of the invention may be more clearly understood by reference to the following detailed description of the invention, the appended claims and to the several drawings attached herein.

BRIEF DESCRIPTION OF THE DRAWINGS

The accompanying drawings, which are incorporated in and form a part of the specification, illustrate some embodiments of the present invention, and together with the descriptions serve to explain the principles therein.

DETAILED DESCRIPTION

Applicant has recognized that there is a market opportunity for systems, means, computer code, and methods that allow a user to establish one or more permissions regarding a file or folder and provide or grant such permissions to one or more other entities. In some embodiments, an entity may be or include an individual person, a group of people, a software application or device, etc. A permission established by a user may be or include allowing an entity to access, read, copy, modify, etc. a file, folder, or other collection or group of documents, files, etc. For purposes of the discussion and claims that follow, such a file, folder, or other collection or group of documents, files, etc. may be referred to as a "stored element".

Figure 1:
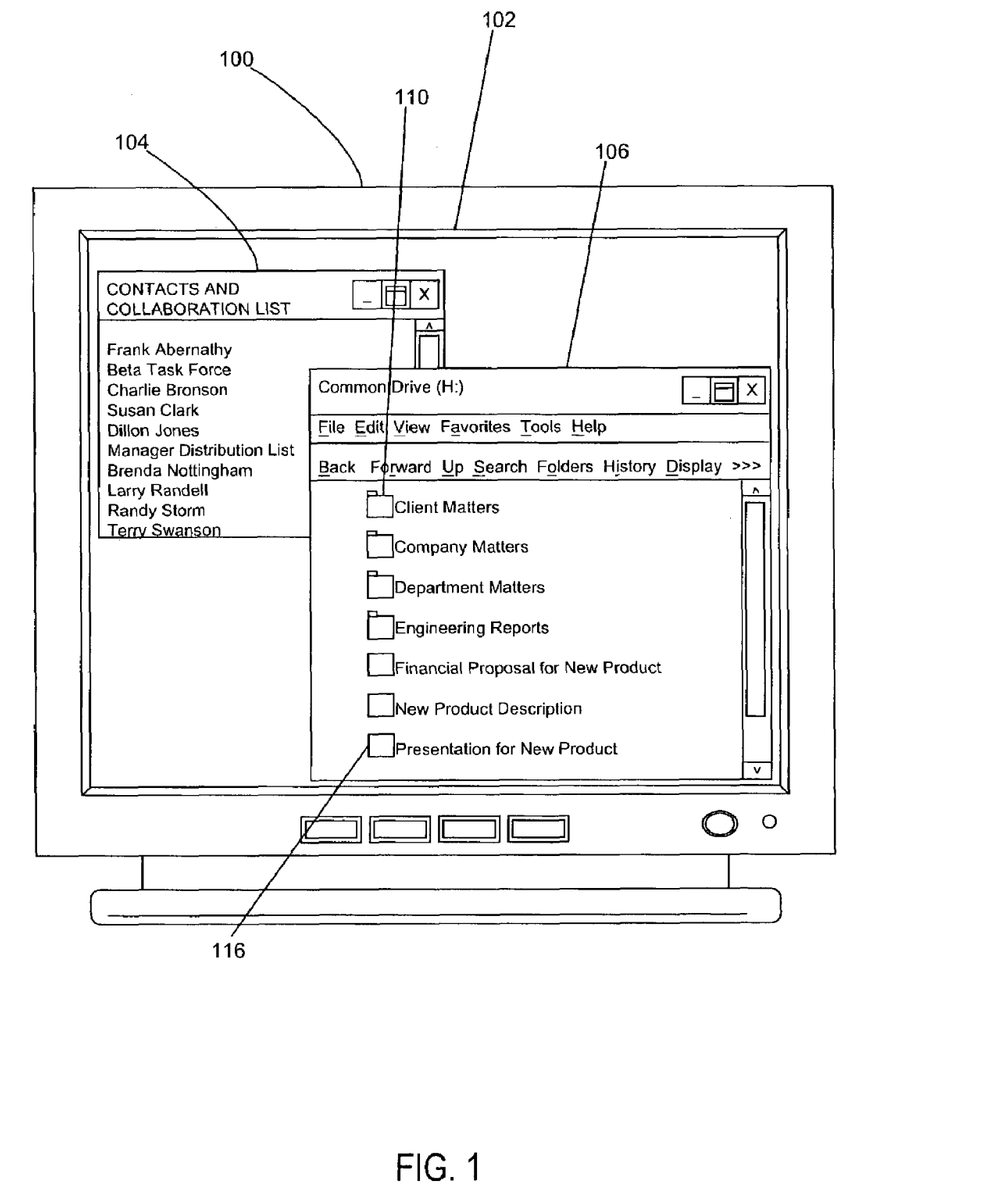
FIG. 1 is an illustration of some embodiments of a system for associating a permission with a folder or file.

Now referring to FIG. 1, a computer monitor or display 100 having a screen 102 is illustrated. In accordance with some embodiments, a window 104 is displayed on the screen 102, the window 104 including a list of entities. For example, the list in the window 104 may be or include a "buddy list" as used in many instant messaging or other presence-based systems or applications. As another example, the list in the window 104 may be or include a contact list maintained by an email program, contact manager application, operating system, employee or human resources software, etc. The list in the window 104 may include one or more names or other identifiers for specific people (e.g., "Frank Abernathy", "Susan Clark"), groups of people (e.g., "Beta Task Force", "Manager Distribution List"), applications, devices, etc. A group may have one or more other entities associated with it. For example, the group identified as "Manager Distribution List" in the window 104 may include all of the management at a particular company. In some embodiments, a group may be created by or via use of another application. For example, an email or contact manager may allow a user to establish a group and to associate one or more people or other entities with the group.

In addition to the window 104, a window 106 also may be displayed on the screen 102. The window 106 may include a list of one or more files (e.g., "New Product Description"), folders (e.g., "Engineering Reports") that may contain or include one or more folders, or other stored elements. In some embodiments, a file or stored element may be or include a document such as, for example, a word processing (e.g., Microsoft Word™) document, a spreadsheet file (e.g., Microsoft Excel™ document), a PDF file, a JPEG file, an MPEG file, an HTML or XML file, an MP3 file, a database record, or other document, image, file, etc. created by a software application or device. The list in the window 106 may be created as part of a file directory, a search results list, a document retrieval, etc. In some embodiments, a folder may include one or more files (which may be of different types) or other stored elements.

As previously described above, in accordance with some embodiments, a user may be associated with the entities listed in the window 104 and/or the files and folders listed in the window 106. That is, the user may have created the list of entities in the window 104 and/or the list of files and folders in the window 106. Typically, while the user may have access to the files and folders listed in the window 106, the entities listed in the window 104 may not have access to the files and folders listed in the window 106.

Pursuant to some embodiments, software operating on a device (e.g., computer, personal data assistant, cellular telephone, work station) may allow the user to select a file listed in the window 106 and associate it with one or more of the entities listed in the window 104. The software may include, work or be integrated with, or be part of an application (Microsoft Outlook™ software, Windows Explorer™ software), software feature, operating system software, or other software operating on the device.

Figure 2:
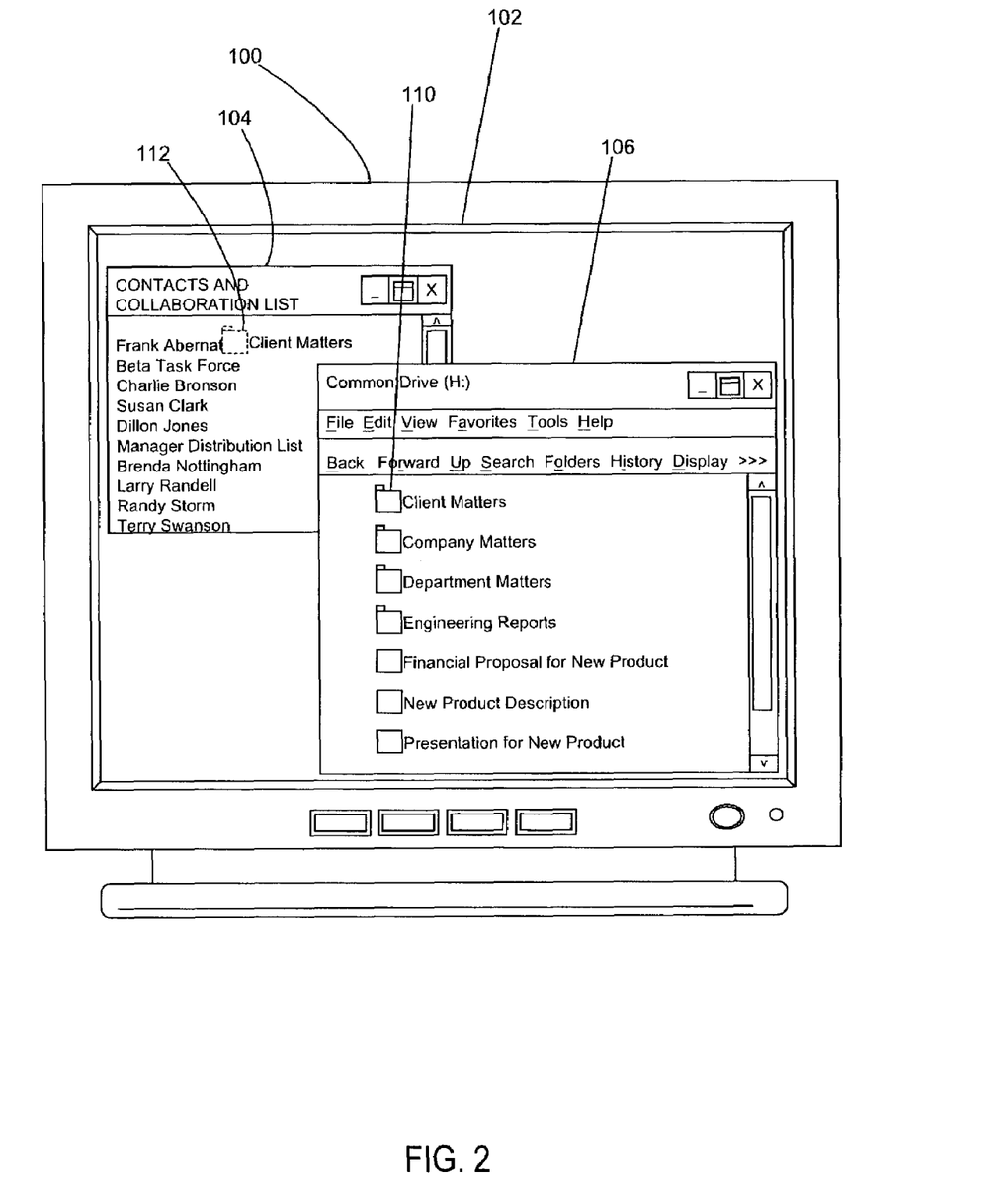
FIG. 2 is another illustration of some embodiments of a system.

The level or type of association may be determined or established by the user on a case-by-case basis, in accordance with one or more defaults previously established by the user, or in accordance with one or more previously defined rules, heuristics, etc. For example, now referring to FIG. 2, a user may click on folder 110 and drag it above the entity name "Frank Abernathy" in the window 104, as indicated at 112. That is, the user may "drag-and-drop" the folder 110 to an entity name listed in the window 104. The software operating on the device then recognizes that the entity name "Frank Abernathy" is not and does not reflect a legitimate or valid place to store a folder or file and determines that the proper action is to allow access to and/or use of the folder 110 by the entity "Frank Abernathy". Thus, the entity named "Frank Abernathy" now has a permission associated with the folder 110.

Figure 3:
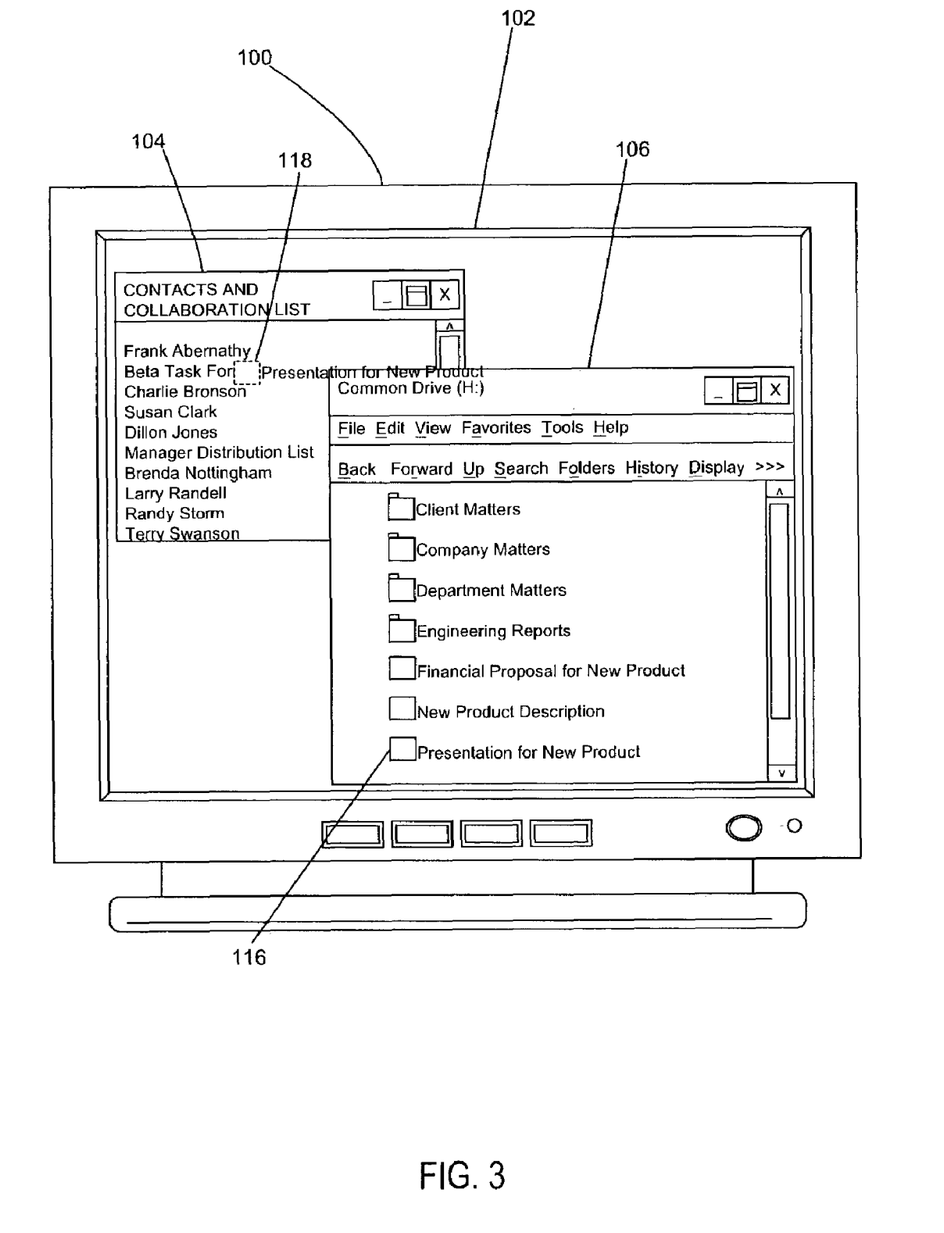
FIG. 3 is another illustration of some embodiments of a system for associating a permission with a stored element.

While this example above dealt with providing permission regarding a folder to an entity, a similar process also can be used to provide permission regarding a file to the entity. For example, now referring to FIG. 3, a user may click on file 116 and drag it above the entity name "Beta Task Force" in the window 104, as indicated at 118. That is, the user may "drag-and-drop" the file 116 to an entity name listed in the window 104. The software operating on the device then recognizes that the entity name "Beta Task Force" is not and does not reflect a legitimate place to store a folder or file and determines that the proper action is to allow access to and/or use of the file 116 by entities included in the entity name "Beta Task Force". Thus, each entity included in the entity named "Beta Task Force" now has a permission associated with the file 116.

Figure 4:
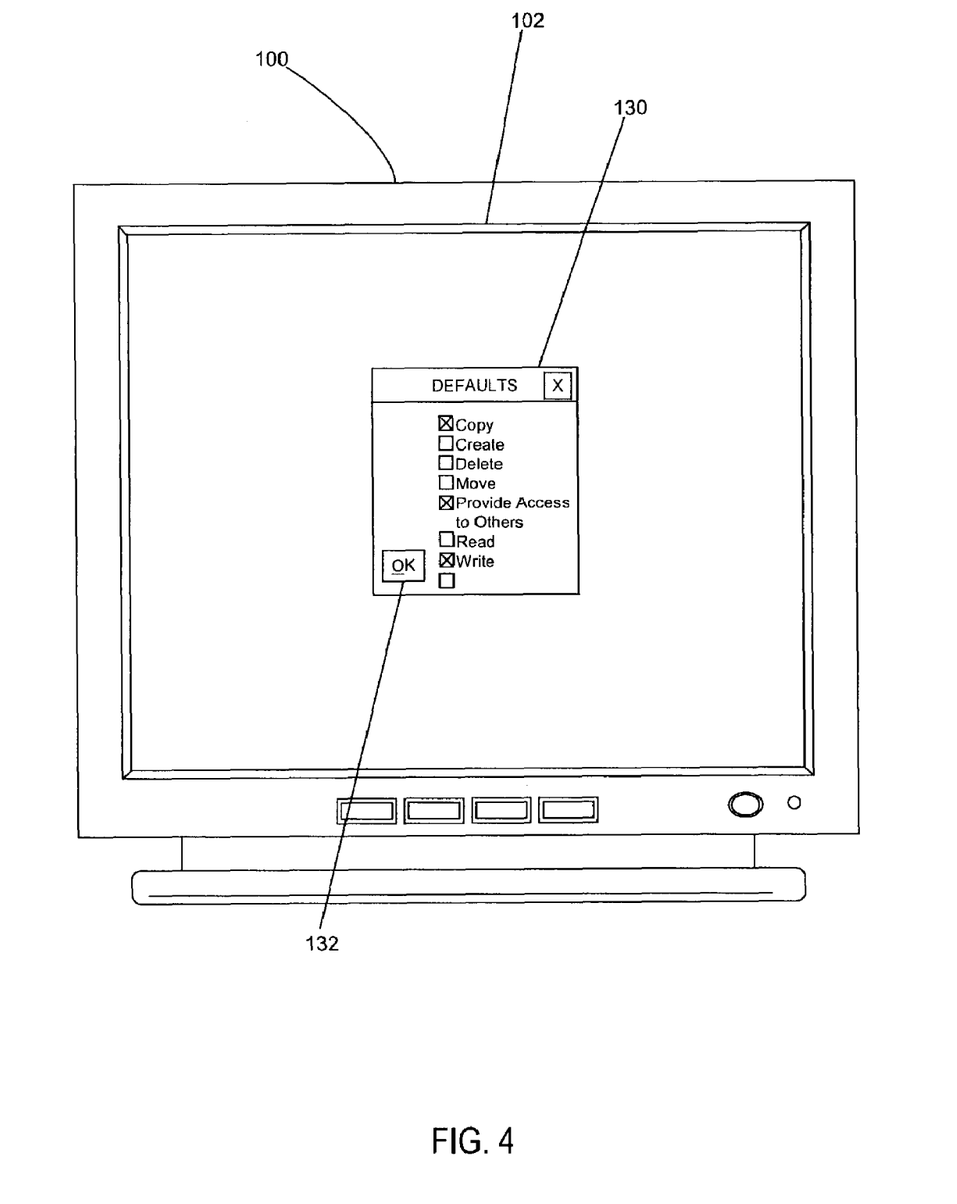
FIG. 4 is another illustration of some embodiments of a system for associating a permission with a stored element.

In some embodiments, a user may establish defaults for use in such a "drag-and-drop" approach. For example, now referring to FIG. 4, software may be configured to display or cause the display of a window 130 on the screen 102 that allows a user to establish one or more default permissions to be associated with an entity regarding a file or folder when the user drags the file or folder onto the entity name. Clicking on or selecting "OK" button 132 may close the window 130. In some embodiments, the window 130 may "pop-up" or be displayed when a file or folder is associated with an entity, as part of a default permission setting processing, as part of configuring an operating system or application, etc.

In some embodiments, permissions regarding a file, folder, or other stored element may include, but are not limited to, one or more of the following: allowing an entity to access, copy, create (with regard to a folder), delete, hide, modify, move, open, read, rename, save, transmit, update, or write the file, folder, or other stored element. As another example, a permission established by the user may allow an entity to provide the same or other permissions regarding the file, folder, or other stored element to another party.

In some embodiments, a user may establish or change a permission regarding a file/folder and an entity on a case-by-case basis. For example, now referring to FIG. 5, a user may click on or otherwise select the file 116 entitled "Presentation for New Product". The action of clicking or selecting the file 116 may cause display of the window 140, wherein the user can select the permissions to be granted regarding the file 116 and select or click on "OK" button 140 to indicate that the user is done selecting permissions. The user can then click on or select an entity name (e.g., the entity "Randy Storm") to indicate that the permissions selected via the window 140 regarding the file 116 should be provided to the selected entity. As an alternative, the window might not be displayed until after the user drags-and-drops the file 116 onto the entity name "Randy Storm".

Figure 5:
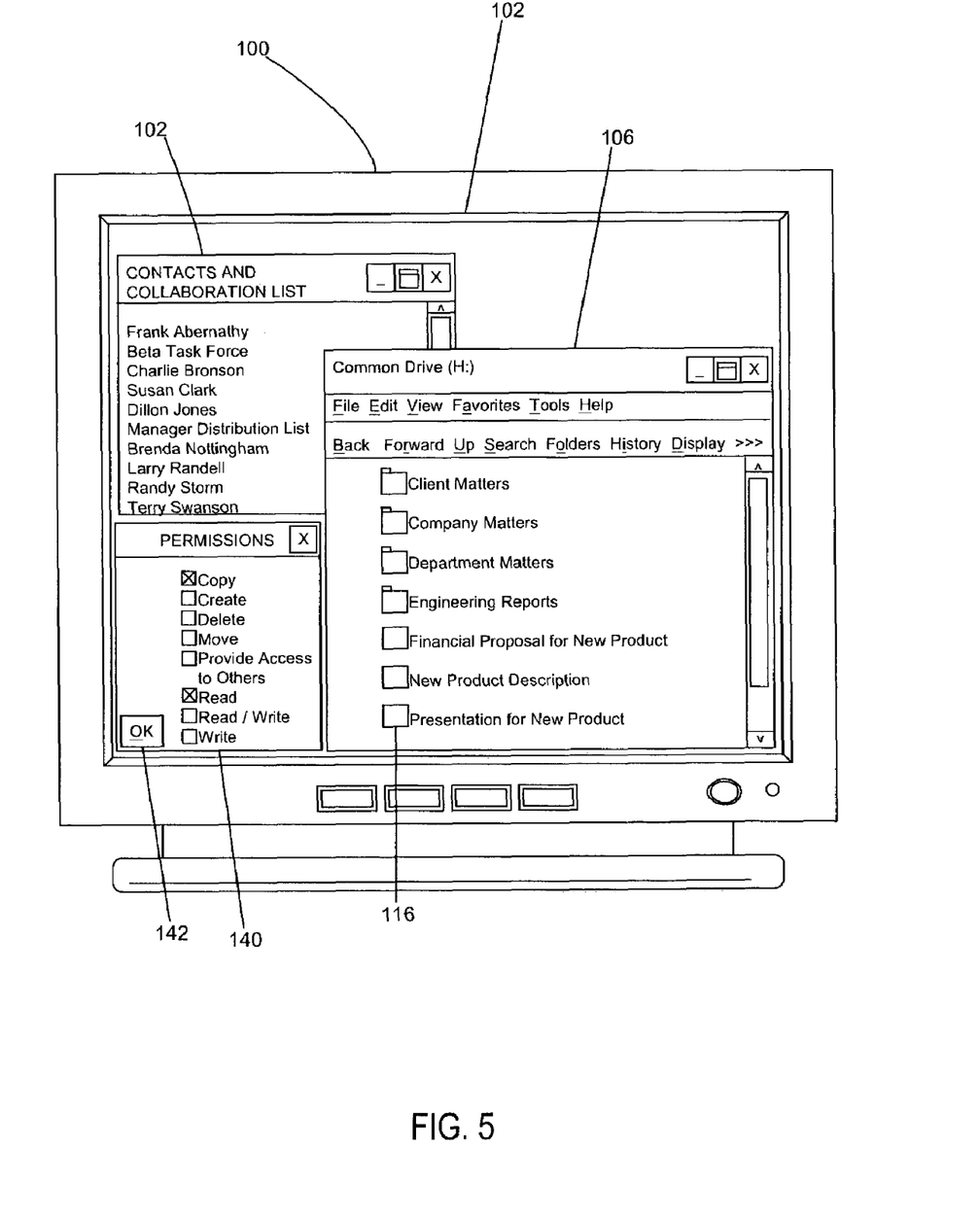
FIG. 5 is another illustration of some embodiments of a system for associating a permission with a stored element.

As another alternative, granting of permissions by a user regarding a file or folder and an entity may be based on use of one or more buttons on a computer mouse. For example, the user may click the right hand button on a mouse to indicate selection of a file, folder, or other stored element. The user may then click the left hand button to bring up the window 140 and select one or more permissions. The user then can click the right hand button again over an entity name to indicate that the entity should have the selected permissions regarding the file, folder, or other stored element. As yet another alternative, after the user has established one or more default settings, the user may right click on a file or folder, left click to indicate that the default permission(s) should be granted regarding the file or folder, and then right click again on an entity name to indicate the entity to which the users is granting the permission(s).

In some embodiments, after a user has granted or changed one or more permissions regarding a file or folder to an entity, a software application or device may send a message or other indicator (e.g., an instant message communication, an email message) to the entity to inform the entity of the new or changed permission, the location of the file, folder, or other stored element, access procedures for the file, folder, or other stored element, etc. In some embodiments, the software application or device also may move or copy the file, folder, or other stored element into a shared area such as common or shared hard drive, common or shared directory, or other common or shared storage area on a computer system.

Process Description

Figure 6:
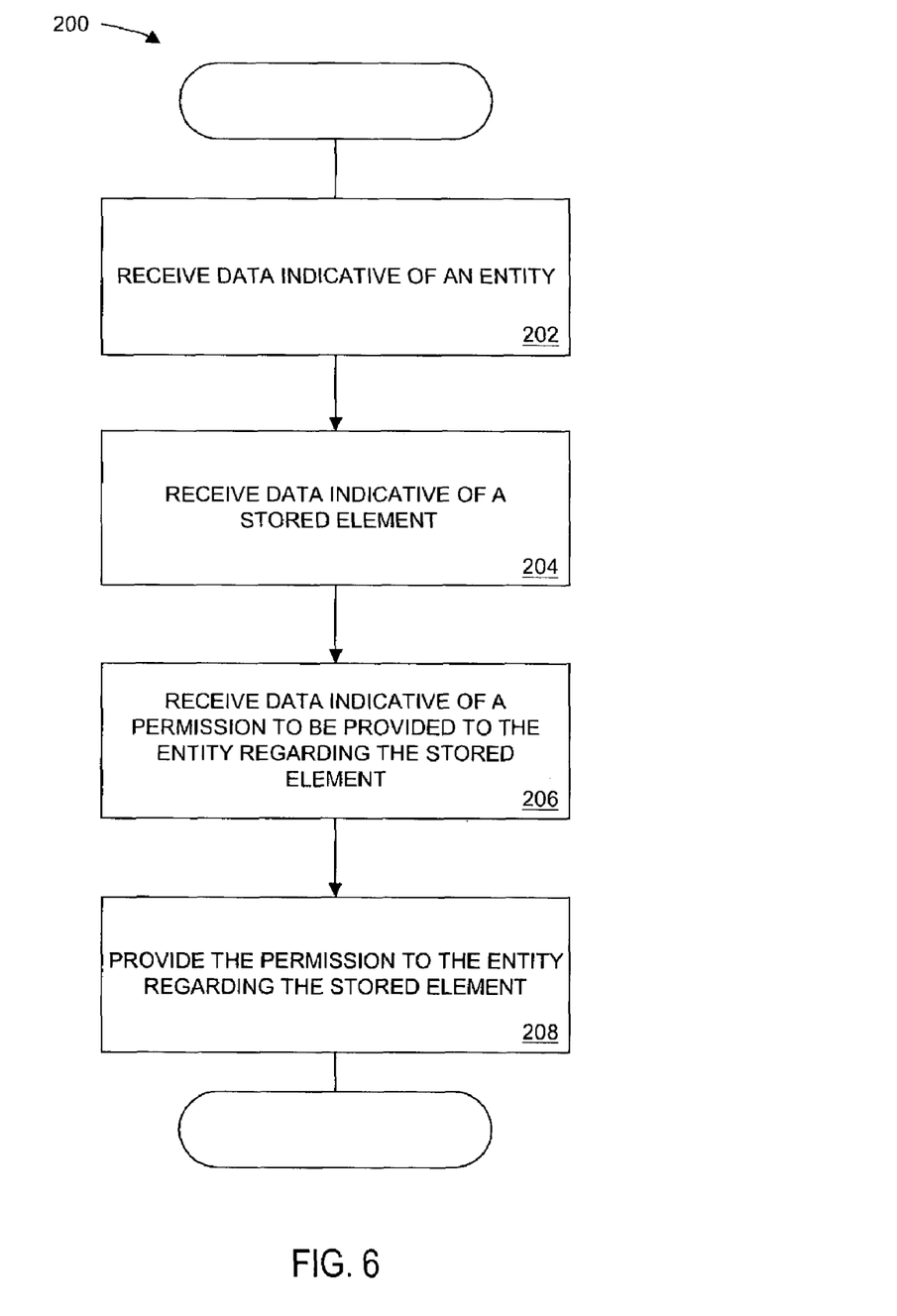
FIG. 6 is a flowchart of a first embodiment of a method.

Reference is now made to FIG. 6, where a flow chart 200 is shown which represents the operation of a first embodiment of a method. The particular arrangement of elements in the flow chart 200 is not meant to imply a fixed order to the elements; embodiments can be practiced in any order that is practicable. In some embodiments, some or all of the elements of the method 200 may be performed or completed by a server, user device and/or another device, as will be discussed in more detail below.

Processing begins at 202 during which a device or software application receives or otherwise obtains data indicative of an entity. As previously discussed above, such data may be received when a user clicks on or otherwise selects an entity name from a list (e.g., a buddy list, a contact list, an employee list, a customer list, a supplier list). In some embodiments, the user may be able to select more than one entity at a time by, for example, selecting a group (e.g., a collaborative or collaborating group) that includes one or more entities or selecting more than one entity from the list simultaneously. In some embodiments, 202 or other part of the method 200 may include displaying or otherwise providing a list of one or more entities via a window, panel, interface, Web page, etc. In addition, the device or application may receive an indication regarding one or more entities selected from the list. In some embodiments, the list may depend on or vary by user, user type, user affiliation, entity affiliation, user location, entity location, application, time/date, online presence status of the user or entities, or other factors, protocols, or criteria.

During 204, the device or software application receives or otherwise obtains data indicative of a file, folder or other stored element. In some embodiments, 204 may occur prior to 202. As previously discussed above, such data may be received when a user clicks on or otherwise selects a file, folder, or other stored element name from a list (e.g., a file directory). In some embodiments, the user may be able to select more than one file and/or folder at a time by, for example, selecting more than one file, folder, and/or other stored element from the list simultaneously. In some embodiments, 204 or other part of the method 200 may include displaying or otherwise providing a list of one or more files, folders, stored elements, etc. via a window, panel, interface, pop-up menu, toolbar, directory list, Web page, etc. In addition, the device or application may receive an indication that one or more files, folders, stored elements, etc. selected from the list. In some embodiments, the list may depend on or vary by user, user type, user affiliation, entity affiliation, application, user location, entity location, time/date, online presence status of the user and/or entities, or other factors, protocols, or criteria.

During 206, the device or software application receives or otherwise obtains data indicative of a permission to be provided to the entity determined during 202 regarding the file, folder, or other stored element determined during 204. As previously discussed above, in some embodiments the permission may be based on a previously created default setting. Thus, 206 may occur prior to either or both of 202 and 204. In some other embodiments, the user may be prompted or required to provide information regarding the permissions, select one or more permissions from a list on a case-by-case basis, etc.

During 208, the device or software application provides the desired permission to the entity determined during 202 regarding the file, folder, or other stored element determined during 204.

In some embodiments, once a user has provided a permission to an entity regarding a file, folder, stored element, etc., the device or application may send a message to the entity regarding the permission and the file, folder, or stored element, the location of the file or folder, passwords or other information needed to access the file, folder, or other stored element, etc. Alternatively, or in addition, the device or software may move the file, folder, or other stored element to a storage location accessible by or available to the entity and/or update a common directory or resource list regarding the file, folder or other stored element. In some embodiments, the method 200 may include determining that a selected or indicated name (e.g., the name "Frank Abernathy" as discussed above in relation to FIG. 2), or location is not a valid place to store a file, folder or other stored element and/or determining that a permission should be granted regarding the selected or indicated name and a selected or indicated stored element.

In some embodiments, the method 200 or other methods for facilitating access to or sharing a file, folder or other stored element may include displaying or otherwise providing a first window, the first window including a second list of at least one entity; displaying or otherwise providing a second window, the second window including a first list of at least one file, folder or other stored element; determining or otherwise identifying a selection of a first file, folder or other stored element from the first list and a first entity from the second list; determining or otherwise identifying a permission to be provided to the first entity regarding the first file, folder or other stored element; and/or providing the permission to the first entity regarding the first file, folder or other stored element.

Device

Figure 7:
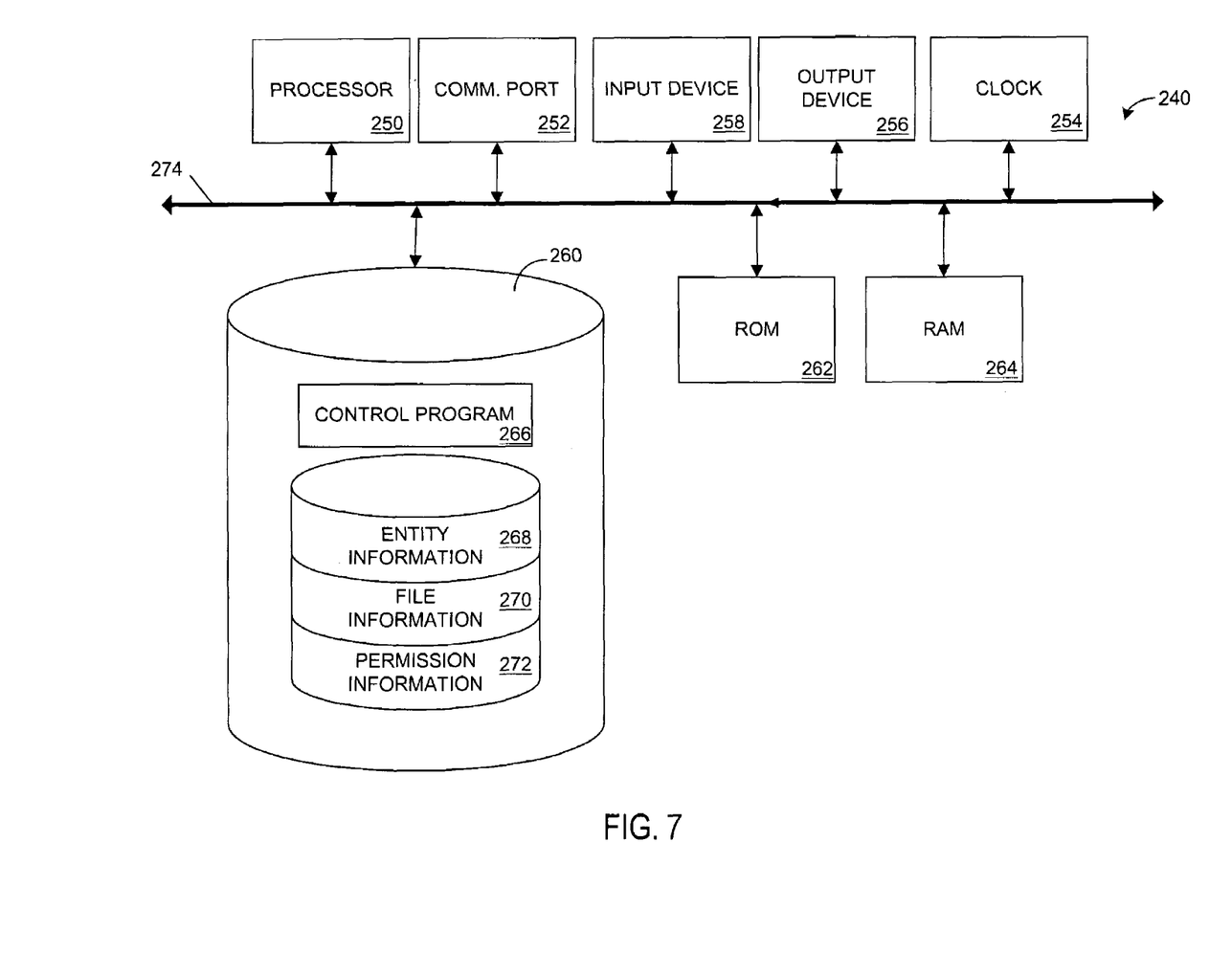
FIG. 7 is a block diagram of components for an embodiment of a system usable in some embodiments.

Now referring to FIG. 7, a representative block diagram of a server, controller, computer or other device 240 is illustrated. The device 240 may work with or include the display 100 previously discussed above and may implement an application, operating system, or other software that allows a user to grant permissions regarding files, folders, etc. to one or more entities. In some embodiments, the device 240 may implement or be adapted to implement one or more elements or methods described herein. For example, in some embodiments, the device 240 may be adapted to display a first window, the first window including a second list of at least one entity; display a second window, the second window including a first list of at least one file, folder or other stored element; determine a selection of a first file, folder or other stored element from the first list and a first entity from the second list; and determine a permission to be provided to the first entity regarding the first file, folder or other stored element. Alternatively, or in addition, the device 240 may be adapted receive or otherwise obtain data indicative of an entity; receive or otherwise obtain data indicative of a file, folder or other stored element; receive or otherwise obtain data indicative of a permission to be provided to the entity regarding the file, folder or other stored element; and/or grant or provide the permission to the entity regarding the file, folder or other stored element.

The device 240 may include a processor, microchip, central processing unit, or computer 250 that is in communication with or otherwise uses or includes one or more communication ports 252 for communicating with user devices and/or other devices. In some embodiments, the processor 250 may be operative to implement one or more of the elements or methods described herein. Communication ports may include such things as local area network adapters, wireless communication devices, Bluetooth technology, etc. The device 240 also may include an internal clock element 254 to maintain an accurate time and date for the device 240, create time stamps for communications received or sent by the device 240, etc.

If desired, the device 240 may include one or more output devices 256 such as a printer, infrared or other transmitter, antenna, audio speaker, display screen or monitor (e.g., the monitor 102), text to speech converter, etc., as well as one or more input devices 258 such as a bar code reader or other optical scanner, infrared or other receiver, antenna, magnetic stripe reader, image scanner, roller ball, touch pad, joystick, touch screen, microphone, computer keyboard, computer mouse, etc.

In addition to the above, the device 240 may include a memory or data storage device 260 to store information, software, databases, communications, device drivers, permissions, files, etc. The memory or data storage device 260 preferably comprises an appropriate combination of magnetic, optical and/or semiconductor memory, and may include, for example, Read-Only Memory (ROM), Random Access Memory (RAM), a tape drive, flash memory, a floppy disk drive, a Zip™ disk drive, a compact disc and/or a hard disk. The device 240 also may include separate ROM 262 and RAM 264.

The processor 250 and the data storage device 260 in the device 240 each may be, for example: (i) located entirely within a single computer or other computing device; or (ii) connected to each other by a remote communication medium, such as a serial port cable, telephone line or radio frequency transceiver. In one embodiment, the device 240 may comprise one or more computers that are connected to a remote server computer for maintaining databases.

In some embodiments, a conventional personal computer, host computer, personal data assistant, kiosk, terminal, server, cellular telephone, workstation, etc. with sufficient memory and processing capability may be used as the device 240. In one embodiment, the device 240 operates as or includes a Web server for an Internet environment. The device 240 may be capable of high volume transaction processing, performing a significant number of mathematical calculations in processing communications and database searches. A Pentium™ microprocessor, such as the Pentium III™ or IV™ microprocessor manufactured by Intel Corporation, may be used for the processor 250. Equivalent processors are available from Motorola, Inc., AMD, or Sun Microsystems, Inc. The processor 250 also may comprise one or more microprocessors, computers, computer systems, etc.

Software may be resident and operating or operational on the device 240. The software may be stored on the data storage device 260 and may include a control program 266 for operating the server, databases, etc. The control program 266 may control the processor 250. The processor 250 preferably performs instructions of the control program 266, and thereby operates in accordance with the methods described. The control program 266 may be stored in a compressed, uncompiled and/or encrypted format. The control program 266 furthermore includes program elements that may be necessary, such as an operating system, a database management system and device drivers for allowing the processor 250 to interface with peripheral devices, databases, etc. Appropriate program elements are known to those skilled in the art, and need not be described in detail herein.

The device 240 also may include or store information regarding users, user devices, entities, files, folders, permissions, communications, etc. For example, information regarding one or more entities may be stored in an entity information database 268 for use by the device 240 or another device or entity. Information regarding one or more files and/or folders may be stored in a file information database 270 for use by the device 240 or another device or entity and information regarding one or more permissions may be stored in a permission information database 272 for use by the device 240 or another device or entity. In some embodiments, some or all of one or more of the databases may be stored or mirrored remotely from the device 240.

According to some embodiments, the instructions of the control program may be read into a main memory from another computer-readable medium, such as from the ROM 262 to the RAM 264. Execution of sequences of the instructions in the control program causes the processor 250 to perform the process elements described herein. In alternative embodiments, hard-wired circuitry may be used in place of, or in combination with, software instructions for implementation of some or all of the methods described herein. Thus, embodiments are not limited to any specific combination of hardware and software.

The processor 250, communication port 252, clock 254, output device 256, input device 258, data storage device 260, ROM 262, and RAM 264 may communicate or be connected directly or indirectly in a variety of ways. For example, the processor 250, communication port 252, clock 254, output device 256, input device 258, data storage device 260, ROM 262, and RAM 264 may be connected via a bus 274.

While specific implementations and hardware/software configurations for a device 240 have been illustrated, it should be noted that other implementations and hardware/software configurations are possible and that no specific implementation or hardware configuration is needed. Thus, not all of the components illustrated in FIG. 7 may be needed for a device implementing the methods disclosed herein.

The methods described herein may be embodied as a computer program developed using an object oriented language that allows the modeling of complex systems with modular objects to create abstractions that are representative of real world, physical objects and their interrelationships. However, it would be understood by one of ordinary skill in the art that the invention as described herein could be implemented in many different ways using a wide range of programming techniques as well as general-purpose hardware systems or dedicated controllers. In addition, many, if not all, of the elements for the methods described above are optional or can be combined or performed in one or more alternative orders or sequences without departing from the scope of the present invention and the claims should not be construed as being limited to any particular order or sequence, unless specifically indicated.

Each of the methods described above can be performed on a single computer, computer system, microprocessor, etc. In addition, two or more of the elements in each of the methods described above could be performed on two or more different computers, computer systems, microprocessors, etc., some or all of which may be locally or remotely configured. The methods can be implemented in any sort or implementation of computer software, program, sets of instructions, code, ASIC, or specially designed chips, logic gates, or other hardware structured to directly effect or implement such software, programs, sets of instructions or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, Zip™ disk, flash or optical memory card, microprocessor, solid state memory device, RAM, EPROM, or ROM.

Although the present invention has been described with respect to various embodiments thereof, those skilled in the art will note that various substitutions may be made to those embodiments described herein without departing from the spirit and scope of the present invention.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

What is claimed is:

1. A method for facilitating granting of a permission regarding a stored element, comprising:
    displaying a contact list including one or more identifiers indicative of an entity, the entity being associated with at least one person and not a data storage identifier or data storage location;
    displaying a list of one or more stored elements being selected from the group consisting of: a file, a folder, a plurality of files, a plurality of folders, and a combination thereof;
    associating the entity with one of the one or more stored elements with the other by dragging and dropping the one of the stored elements onto one of the contact list identifiers indicative of the entity; and
    providing the entity indicated by the one of the contact list identifiers with an access permission to the one of the stored elements in response to said associating the entity with the one of the stored elements.

2. The method of claim 1, further comprising receiving an indication of a selection of said entity by a user.

3. The method of claim 2, further comprising receiving an indication of a selection of said stored element by said user.

4. The method of claim 1, wherein said associating includes receiving an indication of a selection of a stored element from said list.

5. The method of claim 1, wherein said list includes a stored element directory.

6. The method of claim 1,
    wherein said displaying a contact list including one or more identifiers includes displaying a list of entities, said list including said entity.

7. The method of claim 6, wherein said contact list includes a buddy list.

8. The method of claim 6, wherein said contact list includes at least one collaborative group.

9. The method of claim 6, wherein said associating includes receiving an indication of a selection of an entity from said contact list.

10. The method of claim 1, wherein said access permission includes at least one of the following:
    an ability of said entity to open said stored element;
    an ability of said entity to read said stored element;
    an ability of said entity to copy said stored element;
    an ability of said entity to delete said stored element;
    an ability of said entity to modify said stored element;
    an ability of said entity to rename said stored element;
    an ability of said entity to save a modified version of said stored element;
    an ability of said entity to provide a permission to another party regarding said stored element; and
    an ability of said entity to transmit said stored element.

11. The method of claim 1, further comprising:
    providing data to said entity indicative of said access permission.

12. The method of claim 11, further comprising:
    providing data to said entity indicative of said stored element.

13. The method of claim 1, further comprising:
    determining that said entity is not a valid place to store said stored element.

14. The method of claim 1, wherein the access permission is established when said stored element is dragged and dropped onto one of the contact list identifiers.

15. A method for facilitating granting of a permission regarding a stored element, comprising:
    displaying a first window, said first window including a contact list of one or more identifiers indicative of an entity, the entity being associated with at least one person and not a data storage identifier or data storage location;
    displaying a second window, said second window including a list of one or more stored elements;
    determining a selection of a first stored element from said first list and a first identifier from said second list;
    associating the entity with one of the one or more stored elements with the other by dragging and dropping the one of the stored elements onto one of the contact list identifiers indicative of the entity; and
    providing the entity indicated by the one of the contact list identifiers with an access permission to the one of the stored elements in response to said associating the entity with the one of the stored elements.

16. The method of claim 15, wherein the access permission is established when said stored element is dragged and dropped onto one of the contact list identifiers.

17. A system for facilitating granting of a permission to an entity regarding a stored element, comprising:
    a memory;
    a communication port; and
    a processor connected to said memory and said communication port, said processor being operative to:
        display a contact list including one or more identifiers indicative of an entity, the entity being associated with at least one person and not a data storage identifier or data storage location;
        display a list of one or more stored elements indicative of a stored element, the stored element being selected from the group consisting of: a file, a folder, a plurality of files, a plurality of folders, and a combination thereof;
        associate the entity with one of the one or more stored elements with the other by dragging and dropping the one of the stored elements onto one of the contact list identifiers indicative of the entity; and
        provide the entity indicated by the one of the contact list identifiers with an access permission to the one of the stored elements in response to said associating the entity with the one of the stored elements.

18. A computer program product in a computer readable medium for facilitating granting of a permission to an entity regarding a stored element, comprising:
    instructions for displaying a contact list of one or more identifiers indicative of an entity, said entity being associated with at least one person and not a data storage identifier or data storage location;
    instructions for displaying a list of list of one or more stored elements indicative of a stored element, said stored element being selected from the group consisting of: a file, a folder, a plurality of files, a plurality of folders, and a combination thereof;

instructions for associating the entity with one of the one or more stored elements with the other by dragging and dropping the one of the stored elements onto one of the contact list identifiers indicative of the entity; and instructions for granting the entity indicated by the one of the contact list identifiers with an access permission to the one of the stored elements in response to said associating the entity with the one of the stored elements.

19. A computer program product in a computer readable medium for facilitating granting of a permission to an entity regarding a stored element, comprising:

instructions for displaying a first window on a screen, said first window including a contact list of one or more identifiers indicative of an entity, said entity being associated with at least one person and not a data storage identifier or location;

instructions for displaying a second window on a screen, said second window including a list of one or more stored elements;

instructions for identifying a selection of a first stored element from said first list and a first identifier from said second list;

instructions for associating the entity with one of the one or more stored elements with the other by dragging and dropping the one of the stored elements onto one of the contact list identifiers indicative of the entity; and instructions for providing the entity indicated by the one of the contact list identifiers with an access permission to the one of the stored elements in response to said associating the entity with the one of the stored elements.

* * * * *